Feb. 26, 1946.  C. R. BUCHET  2,395,720
HYDRAULIC CHUCK AND CUTTER OPERATING DEVICE
Filed June 27, 1944
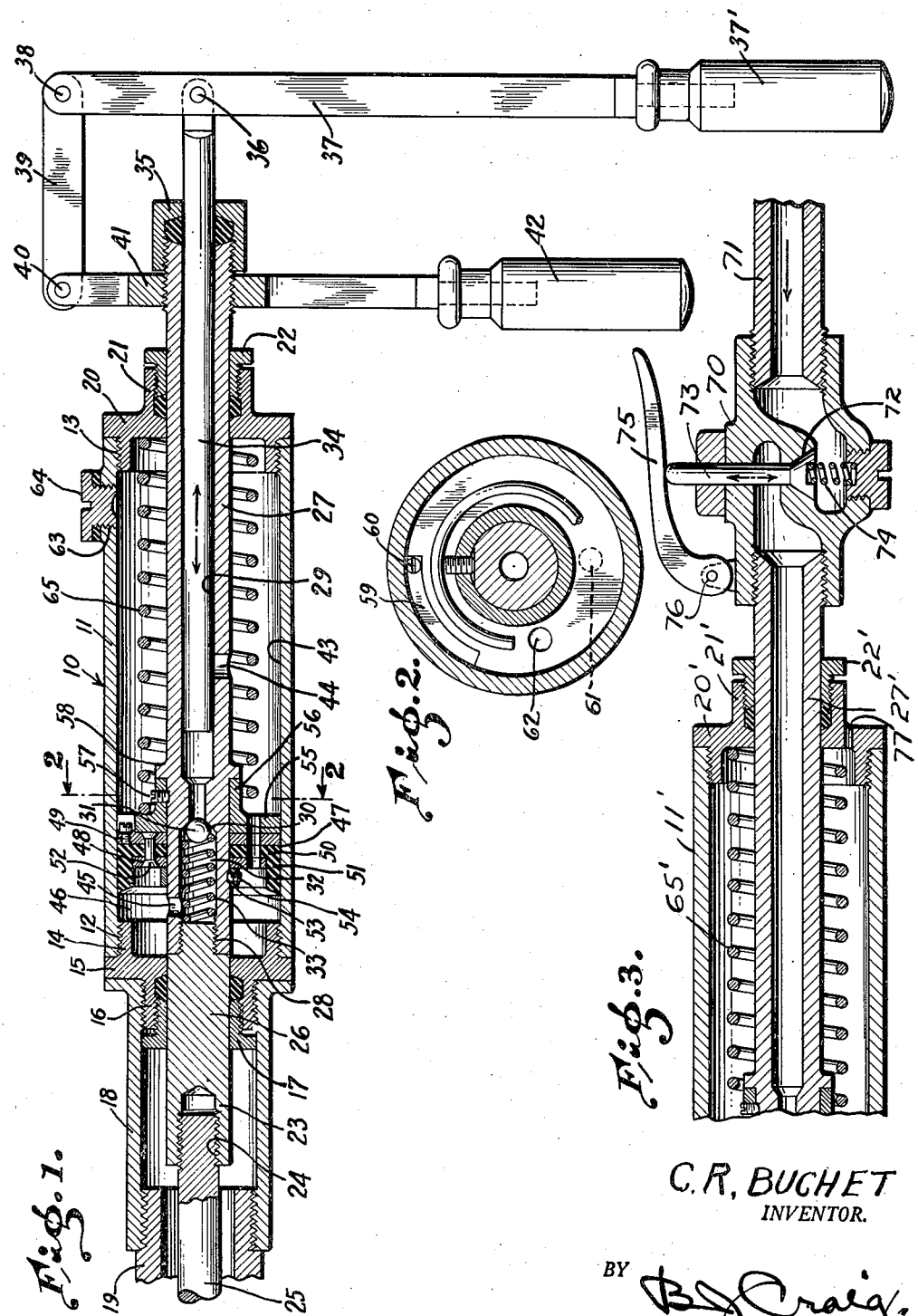
C. R. BUCHET
INVENTOR.
BY B. J. Craig
ATTORNEY Patented Feb. 26, 1946

2,395,720

UNITED STATES PATENT OFFICE 2,395,720

HYDRAULIC CHUCK AND CUTTER OPERATING DEVICE

Conrad R. Buchet, Pasadena, Calif., assignor of three-fourths to B. F. B. Engineers, Incorporated, a corporation of California, and one-fourth to Milton H. Lees, Jr.

Application June 27, 1944, Serial No. 542,391

4 Claims. (Cl. 60—52)

This invention relates to a hydraulic chuck and cutter operating device.

The general object of the invention is to provide an apparatus which may be operated to exert a pulling action upon articles such as a chuck which engages a shank on a rivet of the mandrel extrusion type.

A more specific object of the invention is to provide a novel hydraulic operated pulling member.

A further object of the invention is to provide an apparatus for actuating a pulling member and wherein novel means is provided for causing operation of the device.

A further object of the invention is to provide a chuck and cutter operating device including a cylinder having an operating member therein with a piston on the operating member and wherein novel means is provided for causing movement of the piston.

Other objects and advantages of my invention will be apparent from the following description taken in connection with the accompanying drawing, wherein:

Fig. 1 is a longitudinal sectional view embodying the features of my invention;

Fig. 2 is an enlarged section taken on line 2—2, Fig. 1, and

Fig. 3 is a fragmentary view similar to Fig. 1 showing a modification.

Referring to the drawing by reference characters, I have shown my invention as embodied in a hydraulic chuck and cutter operating device which is indicated generally at 10. As shown the device includes a body or cylinder 11 which is internally threaded at each end as at 12 and 13. The threaded portion 12 threadedly engages a collar 14 on a closure member 15. The closure member 15 includes an annular member 16 which is internally threaded to receive a packing gland 17 and is externally threaded to engage threads on a sleeve 18. The sleeve 18 may be threadedly secured to a member 19 which may be the body of a chuck and cutter member such as is shown in my copending application Serial No. 541,698, filed June 23, 1944.

Remote from the closure 15 I provide the body 11 with a second closure 20 which engages the threads 13 and is provided with a threaded collar 21 which is engaged by a packing gland 22. The members 15, 17, 20 and 22 are apertured to receive an operating member 23 which is of generally cylindrical form and which at its forward end is provided with a recessed threaded portion 24 which threadedly engages a pull member 25 which may be a pull member of the character disclosed in my above mentioned copending application.

The operating member 23 is shown as made of two portions, 26 and 27, which are threaded together as at 28. The portion 27 is provided with a piston bore 29 which communicates with a valve seat 30, engaged by a ball valve 31 arranged in a chamber 32. A spring 33 normally urges the ball valve 32 to seated position.

Within the bore 29 I provide a plunger 34 which works through a packing gland 35 on the end of the portion 27 and is pivotally connected by a pin 36 with an operating handle member 37 having a grip 37' thereon. The handle member 37 is pivotally connected at 38 to a link 39 which in turn is connected by a pin 40 to a support member 41 which has a grip portion 42 thereon. The portion 41 threadedly engages the end of the portion 27. By grasping the member 42 and operating the handle member 37 the plunger 34 is caused to reciprocate and when at its outer position permits fluid in a chamber 43 within the body 11 to be drawn through a hole 44 when the plunger clears the hole. On its forward motion the plunger forces the fluid within bore 29 past the valve 31 and through a passage 45 into a chamber 46 which surrounds the member 23. As the amount of fluid in the chamber 43 is increased it acts on and moves a piston 47 which operates in the body bore.

The piston 47 includes front and rear annular members 48 and 49 which clamp between them the flange 50 of a cup member 51. Rivets 52 serve to hold the parts together. A collar 53, secured on the portion 27 by means of a set screw 54, serves to prevent movement of the piston along the portion 27 in one direction.

The piston engages an annular push member 55, having a collar 56, which is held on the portion 27 by a set screw 57. The collar abuts against a flange 58 on the portion 27. The push member 55 is provided with a cut-out portion 59 in its periphery as shown in Fig. 2. This cut-out portion receives a screw or stop member 60, secured in the rear member 49 of the piston.

The construction is such that the piston is held against rotating by its engagement with the wall of the body 11 while the member 55 is caused to rotate when the handle 42 is turned about the axis of the member 34 so that the piston 47 and push member 55 have relative angular motion. The piston parts and the push member 55 are provided with apertures 61 and 62, respectively. When the parts are in the position shown in Fig. 1 the apertures are aligned to provide passage from the chamber 46 to the chamber 43.

When the handle 42 is rotated to bring the parts out of alignment, as shown in Fig. 2, communication is shut off between the chamber 46 and the chamber 43.

The body 11 is provided with a filling aperture 63 which is provided with a closure 64 so that operating fluid may be supplied to the chamber 43.

A spring 65 engages the closure 20 and push member 55 to normally urge the latter towards the closure member 15.

In use the sleeve 18 is connected to the body member 19 of the chuck or cutter, which may include the pull member 25 which latter is connected to the operating member 23 by the threads 24. The cylinder 11 is filled with oil or other suitable material. The operator then grasps the member 42 and rotates this member to bring the apertures 61 and 62 out of registration. The operating member 37 is then reciprocated to operate the plunger 34, thus pumping fluid into the chamber 46 to move the piston and operating member 23 to thereby pull the member 25. When the member 25 has been fully pulled the pumping action is stopped and the member 42 is rotated about the axis of the cylinder to bring the apertures 61 and 62 into registry, whereupon the spring 65' returns the parts to the initial position.

In Fig. 3 I show a modification of my invention wherein parts similar to those previously described are designated by similarly primed reference numerals. In the modification the plunger 34 and the hole 44 are omitted and the portion 27' is connected by a valve 70 with a source of fluid, such as compressed air, by means of a pipe 71. The valve includes a seat 72, engaged by a valve 73 which is normally urged closed by a spring 74. The valve is adapted to be opened by an arm 75 pivoted on the valve at 76. The closure 20' includes a bleed aperture 77.

In operating the modification the valve 70 is rotated about the axis of the portion 27' to close communication through the piston apertures. Thereafter the arm 75 is rocked to open the valve to cause fluid to flow into the chamber 46 as previously described. When the pulling operation is completed the valve 70 is rotated to bring the piston apertures into registration, whereupon the spring 65' restores the parts to the initial position.

From the foregoing description it will be apparent that I have invented a novel fluid operated chuck and cutter actuating device which is simple in construction and which is efficient for its intended purpose.

Having thus described my invention, I claim:

1. A fluid operator including a body having a bore and having closed ends, an operating member movable in said body and projecting at each end beyond the body, said operating member having a plunger bore therein and having a chamber communicating with said plunger bore, one-way valve means permitting flow of fluid from the plunger bore to the chamber, a piston on said operating member and rotatable relative thereto, said piston being movable in said body bore, a push member secured to said operating member and engaging said piston, said piston and said push member having apertures therein which are aligned when the piston and push member are in one position of angular adjustment, means to limit the relative angular movement between the piston and push member, said body having a second chamber in advance of the piston, said operating member having a passage from said first chamber to the second chamber, a plunger in said plunger bore, said operating member having a hole extending from said plunger bore to the interior of said body, means for rotating said operating member and for reciprocating said plunger, and spring means normally urging said push member forwardly in said body.

2. A fluid operator including a body having a bore and having closed ends, an operating member movable in said body and projecting at each end beyond the body, said operating member having a plunger bore and having a chamber communicating with said plunger bore, one-way valve means permitting flow of fluid from the plunger bore to the chamber, a piston on said operating member and rotatable relative thereto, said piston being movable in said body bore, a push member secured to said operating member and engaging said piston, said piston and push member having apertures therein which are aligned when the piston and push member are in one position of angular adjustment, means to limit the relative angular movement between the piston and push member, said body having a second chamber in advance of the piston, said operating member having a passage from said first chamber to the second chamber, a plunger in said plunger bore, said operating member having a hole extending from said plunger bore to the interior of said body, a support member secured on said operating member, an operating handle member pivotally supported on said support member and pivotally connected to said plunger for reciprocating said plunger, and spring means normally urging said push member forwardly in said body.

3. A fluid operator including a body having a bore and having closed ends, an operating member movable in said body and projecting at each end beyond the body, said operating member having a bore therein and having a chamber communicating with said plunger bore, one-way valve means permitting flow of fluid from the plunger bore to the chamber, a piston on said operating member and rotatable relative thereto, said piston being movable in said body bore, a push member secured to said operating member and engaging said piston, said piston and said push member having apertures therein which are aligned when the piston and push member are in one position of angular adjustment, means to limit the relative angular movement between the piston and push member, said body having a second chamber in advance of the piston, said operating member having a passage from said first chamber to the second chamber, means to supply fluid under pressure to the operating member bore, means to bleed the body bore, means for rotating said operating member, and spring means normally urging said push member forwardly in said body.

4. A fluid operator including a body having a bore and having closed ends, an operating member movable in said body and projecting at each end beyond the body, said operating member having a bore and having a chamber communicating with said operating member bore, one-way valve means permitting flow of fluid from the operating member bore to the chamber, a piston on said operating member and rotatable relative thereto, said piston being movable in said body bore, a push member secured to said operating member and engaging said piston, said piston and push member having apertures therein which are aligned when the piston and push member are in one position of angular adjustment, means to limit the relative angular movement between the piston and push member, said body having a second chamber in advance of the piston, said operating member having a passage from said first chamber to the second chamber, means to supply fluid under pressure to said operating member bore and spring means normally urging said push member forwardly in said body.

CONRAD R. BUCHET.